Nov. 5, 1963   C. V. BERGSTROM   3,109,662
FLEXIBLE SEALING GROMMET
Filed March 2, 1961

INVENTOR.
CARL V. BERGSTROM
BY
ATTORNEY

# United States Patent Office 3,109,662
Patented Nov. 5, 1963

3,109,662
FLEXIBLE SEALING GROMMET
Carl V. Bergstrom, Los Angeles, Calif.
(645 E. Ocean Blvd., Long Beach, Calif.)
Filed Mar. 2, 1961, Ser. No. 93,003
3 Claims. (Cl. 277—178)
(Granted under Title 35, U.S. Code (1952), sec. 266)

The invention described herein may be manufactured and used by and for the Government of the United States of America for governmental purposes without the payment of any royalties thereon or therefor.

This is a continuation-in-part application of patent application Serial No. 761,271, filed September 15, 1958, and now abandoned.

This invention relates to flexible grommets for guarding cables or conduits passing through wall apertures and provide a water tight enclosure therefor. In the past, the general practice has been to employ a metal stuffing tube welded at its smaller end to the wall or partition and provided with an internal diameter small enough to snugly fit the external diameter of the cable. The internal bore of the large end is threaded and adapted to receive a gland nut for compressing a water tight packing, and thereby fastening the cable or elongated member and sealing the aperture. Some of the disadvantages of the gland type stuffing tube include the trouble of sizing the tube to the cable and aperture, the careful layout of the aperture location in the bulkhead, the difficulty of welding the stuffing tube to the bulkhead at the aperture, stocking separate sizes for each variation in cable size and providing a knockout or aperture for each tube size.

In view of the troubles related above with reference to the use of the standard stuffing tube or packing gland, various types of flexible grommets have been developed which accommodate several sizes of cable and can be readily positioned by hand in the apertures. Such grommets can be produced at a great saving over the cost of the stuffing tube but the novel features employed for retaining the grommets in the apertures and sealing the same are either too complicated and therefore, expensive, or else are liable to fail in operation.

In the present invention an inexpensive flexible grommet of simple design has been provided which can be readily positioned in the bulkhead aperture and each size grommet is adapted to accommodate several wall thicknesses and cable aperture sizes. To accomplish this a sacrifice in assembly fit may result when extreme sizes of cable and aperture are employed. However, this condition is alleviated by the special features of the flexible grommet whereby the external fluid pressure the grommet is designed to preclude, is employed for tightening the feather edged seal of the grommet around the periphery of the elongated member extending through the grommet bore.

In addition to the above, the grommet is provided with a peripheral groove for locating the grommet in the wall aperture and is made basically wide enough to accommodate various bulkhead wall thicknesses. The groove is provided with one radial side wall adapted to coincide with the external bulkhead wall area immediately surrounding the aperture. The other side wall of said groove is inclined at an angle with the internal bulkhead wall surface to provide a groove of increasing width in proportion to its distance from the grommet axis. In combination with said groove, an elastic retaining and sealing ring is employed to hold the grommet firmly in the aperture. A dual function of the ring is to exert sufficient pressure to provide a preliminary block between the bulkhead outer wall face and said radial side wall of the grommet groove to seal the surfaces and exclude the external pressure fluid from entering the peripheral groove. At the same time the ring acts as a direct dam between the bulkhead inner wall face and the inclined side wall face of the groove, as a secondary block to prevent the fluid from entering the inner compartment should the pressure fluid escape by the preliminary block and enter the groove. Therefore the primary object of the invention is to provide a simple, inexpensive and efficient grommet.

Another object is to provide a grommet that may be more readily assembled on the cable and in the aperture of the bulkhead.

A further object is to provide a grommet adapted to accommodate several sizes of cables and fit a range of aperture sizes and wall thickness.

Still another object is to provide a flexible grommet employing a peripheral groove for accommodating the wall aperture, in combination with an elastic ring for indirectly pressure sealing the coinciding external surfaces and at the same time directly blocking the internal portion of said groove bordered by the inclined face of the groove and the internal wall face while retaining the grommet in said wall aperture.

Another object is to employ a grommet design that presents a feather edge at the end of its axial bore, adapted to normally adhere to and seal the elongated member surface against a minimum of external fluid pressure and further that due to the peripheral grommet surface contour said feather edge becomes more pronounced as the external fluid pressure increases to provide a tighter seal at higher pressures.

Another object is to provide cooperative means for locking the grommet and sealing it to the bulkhead regardless of the wall thickness at the aperture.

A final object of the present invention is the provision of a resilient grommet of general torus shape carrying an elongated member or cable and readily assembled and sealed in a bulkhead aperture in a manner to permit angular distortion of the cable without affecting the seal.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
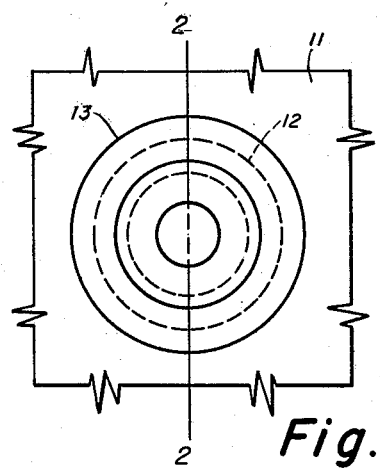
FIG. 1 is an end elevation of the grommet mounted in the aperture of wall member.

In detail the grommet design incorporates features first for retaining and sealing the grommet per se in a bulkhead or wall aperture and second for retaining and sealing an elongated member or cable extending through the grommet bore.

A wall member 11 such as the bulkhead in a ship is provided with an aperture 12 through which a cable 19 is to be run. In place of the old fashion stuffing tube used for retaining and sealing an elongated member in the aperture, the proposed resilient grommet 13 as illustrated herein, has been provided.

In order to provide a seal at the junction of the grommet and the aperture an annular peripheral groove 16 has been provided in the grommet with a base 15 having approximately the same diameter as the aperture 12. The width of groove 16 is greater than the thickness of the wall 11 whereby various wall thicknesses can be accommodated in said groove 16 without distorting it, and particularly the radial face 23 which is normally perpendicular to the axis 26 and designed to coincide and make sealing contact with the external surface 27 of bulkhead 11 adjacent the aperture to prevent the external pressure fluid 21 from entering groove 16.

The other face 24 of groove 16 is inclined at an angle with the inner wall surface 28 thus outlining a wedge shaped groove whose width increases in proportion to its radial distance from the axis 26 of said annular groove 16. After the groove 16 of grommet 13 is positioned in the aperture 12 of wall 11, an elastic retaining and sealing ring 29 is stretched over the internal peripheral surface of the grommet until it springs into position in the groove between the inclined face 24 and the adjacent internal wall surface 28.

Figure 3:
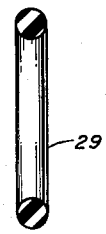
FIG. 3 is a side elevation in section of the elastic retaining and sealing ring.
Figure 4:
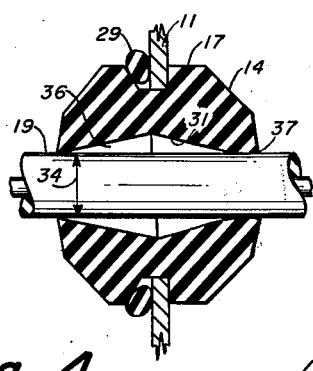
FIG. 4 is a cross section of a grommet and sealing ring mounted in a wall aperture showing an elongated member extending through the grommet bore.
Figure 5:
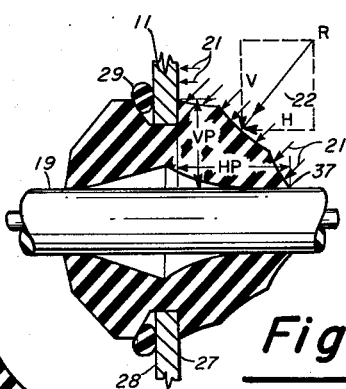
FIG. 5 is similar to FIG. 4 and in addition showing diagrammatically the forces of an external pressure fluid exerted against the external wall and peripheral surface of said grommet.
Figure 6:
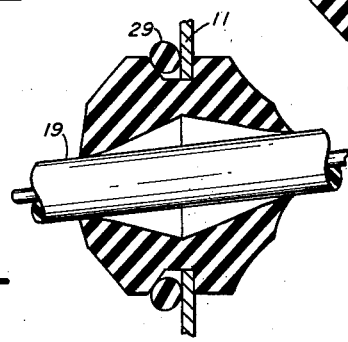
FIG. 6 illustrates a grommet with the elongated member extending through the grommet bore at an angle to its normal axis.
Figure 8:
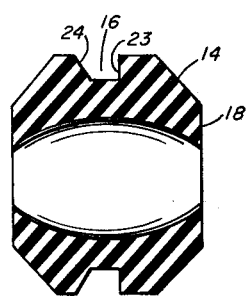
FIG. 8 illustrates a grommet in section provided with a concave bore.

The sealing ring 29 is shown in cross section in FIG. 3 where its section is illustrated as circular when in a relaxed condition. In FIGS. 4, 5, and 6 the cross sections of the rings 29 are shown in various degrees of distortion due to the amount of tension exerted by the elastic ring as a result of the different size wall thicknesses varying the width of the groove and in turn the circumferential length the ring must assume in the groove in accordance with its radial distance from the axis 26.

The elastic ring 29 as shown in FIG. 5 performs three functions first by retaining the grommet 13 firmly in position in the aperture 12. Secondly, the ring tension presses the radial face 23 of the groove against the external wall surface 27 adjacent the aperture to provide an indirect pressure seal for excluding the pressure fluid 21 from entering the groove 16. Finally, in case pressure fluid 21 is able to force its way by into the groove 16, the elastic ring 29 then functions as a direct block or dam between the inclined face 24 and the inner wall surface 28, thus providing a second line of defense for excluding pressure fluid.

Figure 2:
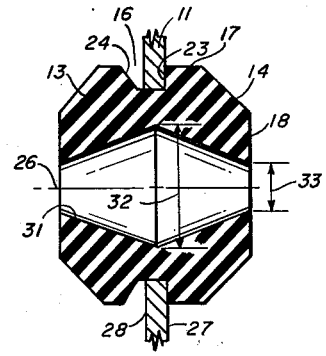
FIG. 2 is a cross section of the same on line 2—2 of FIG. 1.

In addition to sealing the aperture 12 the major function of the grommet design is to provide an axial bore 31 capable of accommodating a variety of cable sizes and still maintain a perfect seal between the leading edge 37 of the grommet bore and the surface of the cable or elongated member 19. By reference to FIG. 2, showing a grommet 13 mounted in the wall aperture 12, the external peripheral surface comprises the axial annular portion 17, the radial portion 18, and the connecting beveled portion 14 having an overall slope as illustrated by the broken line 38, FIG. 7. In FIG. 2 the grommet is shown in its relaxed condition. The outline of the cross section of the bore 31 appears as two truncated cones joined at a common base at the central diameter numeral 32 and the outer ends of the bore toward the apex end of the cones having a diameter indicated by numeral 33. The bore diameters mentioned above, namely the central 32 and end 33 are important in their relationship with elongated member diameter 34, FIG. 4. By inserting the cable or member 19 into the bore 31 of grommet 13 before being subjected to pressure fluid 21 the annular sides of the truncated bore will flatten out so that angle "a" will become smaller as the size cable employed is increased. The change in slope between 31 of FIG. 2 and 31, FIG. 4, after inserting the cable is obvious when comparing said figures. A further feature involves the limitation where various size members 19 may be used but in any case the cable diameter 34 must be greater than the bore end diameter 33 but less than the center diameter 32, to provide the feather edge 37 contact between the member and grommet and leave an annular clearance space 36 between the grommet and member.

By comparing FIGS. 2, 4, and 5 progressively, in anticipation of applying pressure fluid to the external or exposed surfaces of the device, it may be assumed that the grommet 13 of FIG. 2 would remain the same shape as shown if a cable the same diameter as 33 were extended through the grommet bore 31. If an external pressure 21 was then applied the leading edge 37 would be forced inward, in place of downward onto the elongated member surface and ultimately would cause the pressure fluid to leak into the annular space and through the grommet bore 31 into the internal compartment.

By FIG. 4 the leading edge 37 has been partially feathered by merely inserting cable 19 through bore 31 and the overall slope 38 of the peripheral surface has decreased whereby the angle of incident A has decreased. In this position any increase in the external pressure 21 will tend to further decrease the slope 38 and sharpen the featheredge 37 and tighten the seal between the featheredge and elongated member contact.

In order to accomplish the above results it is desirable that a clearance space 36 be provided to receive the grommet section displaced by said fluid pressure as shown in FIG. 5. Although the resilience alone of said grommet might allow for this distortion, nevertheless, I find it desirable to provide the clearance space 36 for best results.

Figure 7:
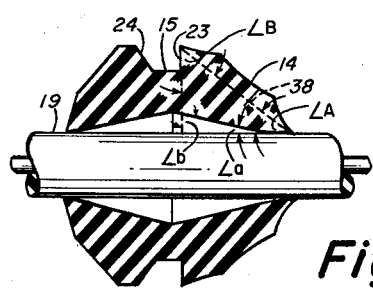
FIG. 7 illustrates in cross section a grommet and elongated member extending through its bore and showing diagrammatically the angles of incident between the grommet surfaces and the elongated member under normal pressure fluid stress.

In operation, theoretically the fluid pressure 21 is exerted externally against the peripheral surfaces 17, 18 and 14 having a general slope as represented by broken line 38 with a pressure resultant "R" perpendicular to 38 which are resolved into the horizontal component H and the vertical component V. Since V is greater than H the resultant force will operate to squeeze the grommet body and partially displace it into space 36 whereby the contact of the featheredge 37 between the grommet 13 and elongated member 19 becomes greater as the pressure increases and improves the seal. This advantage is gained because a satisfactory featheredged seal is produced even at negligible pressures as shown in FIG. 4. Therefore so long as the angle the overall slope of the grommet periphery, as represented by line 38, makes with the elongated member or horizontal projection HP is less than the angle the slope makes with the vertical projection VP, the sealing qualities will persist. In other words the horizontal angle of incident "A" as shown in FIG. 7 must be less than the vertical angle of incident "B."

Obviously many modifications and variations of the present invention are possible in the light of the above teachings. It is therefore to be understood that within the scope of the appended claims the invention may be practiced otherwise than as specifically described.

What is claimed is:

1. A fluid-pressure grommet adapted to seat in a partition wall aperture and provide a sealed passage through the partition for a cable, said grommet being further adapted for seating in partition walls having a specific range of thicknesses and to pass cables having a specific range of diameters, said grommet comprising:

a body portion formed of a resilient rubber-like material provided axially with a bore for receiving and passing said cable through said partition, said body portion further having its peripheral surface formed with an annular extent paralleling said bore axis and with beveled extents leading from each side of said annular extent to each end of said bore, said annular extent being formed at its central portion with a circumferentially-disposed radially-directed groove for seating said grommet in said partition wall aperture, said groove having a base portion paralleling said bore axis, an outwardly-beveled wall, and a radial wall whereby said partition wall can be received in the groove in flush contact with said radial wall, said groove base being greater in width than a maximum partition thickness whereby said seated partition is spaced from said beveled wall, a resilient sealing and retaining continuous ring of less diameter than said groove base, the ring being mounted in said groove between said seated partition and said beveled groove wall for filling said space between said members and for maintaining said sealed partition flushly in tight contact with said groove radial wall for firmly retaining said grommet in said partition aperture, the peripheral portion of said grommet extending between said radial groove wall and its proximate bore end providing a pressure-exposed face and said face having an overall slope such that the overall inclination of its slope with said bore axis is less than 45° whereby pressure exerted on said face tends to continuously flatten said face against an assembled cable and increase the sealing effect of the engagement of the grommet with the cable, and said axial bore being concavely shaped with its end diameters smaller than the minimum diameter of said cable diameter range and its center diameter sufficiently large for providing an annular space between said bore surfaces and a maximum diameter cable received in said bore, whereby insertion of said cable into said bore feathers said pressure face cable-contacting surfaces against the cable and said central annular space provides a vacant area for facilitating further feathering when said pressure face is subjected to external pressure.

2. The grommet of claim 1 wherein said beveled extents of the grommet's peripheral surface are formed of steeply-beveled extents leading directly into said bore ends, and moderately-beveled extents coupling said steep beveled extents with said annular extent.

3. The grommet of claim 2 wherein said bore is formed in the shape of a pair of truncated cones having a common base.

References Cited in the file of this patent
UNITED STATES PATENTS

| | | |
|---|---|---|
| 1,010,592 | Cole | Dec. 5, 1911 |
| 1,218,216 | Schmid | Mar. 6, 1917 |
| 2,225,472 | Franklin | Dec. 17, 1950 |

FOREIGN PATENTS

| | | |
|---|---|---|
| 262,532 | Great Britain | Dec. 10, 1926 |